United States Patent

Mori et al.

[11] 4,320,497
[45] Mar. 16, 1982

[54] METHOD FOR TESTING COMMUNICATION PATHS

[75] Inventors: Hideyasu Mori, Hino; Eizo Kishikawa, Machida, both of Japan

[73] Assignee: Tokyo Shibaura Denki Kabushiki Kaisha, Kawasaki, Japan

[21] Appl. No.: 100,879

[22] Filed: Dec. 6, 1979

[30] Foreign Application Priority Data

Dec. 7, 1978 [JP] Japan .............................. 53-151694
Dec. 7, 1978 [JP] Japan .............................. 53-151695

[51] Int. Cl.$^3$ .......................................... H04Q 11/04
[52] U.S. Cl. .............................. 370/14; 179/175.2 R
[58] Field of Search ................... 370/14, 13, 67, 66; 179/175.2 R

[56] References Cited

U.S. PATENT DOCUMENTS

| | | | |
|---|---|---|---|
| 3,823,269 | 7/1974 | Saito | 370/14 |
| 4,048,445 | 9/1977 | Ghisler | 370/14 |
| 4,149,038 | 4/1979 | Pitroda et al. | 370/14 |

FOREIGN PATENT DOCUMENTS 49-130115 12/1974 Japan .
53-7244 3/1978 Japan .

*Primary Examiner*—Douglas W. Olms
*Attorney, Agent, or Firm*—Cushman, Darby & Cushman

[57] ABSTRACT

A method for testing communication paths of an electronic exchange which has at least one pair of time-sharing communication highways and in which a plurality of port circuits are connected to one another in time-sharing fashion through the first and second communication highways. In the method, test data are allotted to prescribed time slots and are transferred to receiving means through the communication highways. The test data are fed back from the port circuits whose hybrid transformers are in non-matching state, then allotted to different time slots, and finally transferred to a dual tone multi-frequency signal receiver through the communication highways.

6 Claims, 16 Drawing Figures

METHOD FOR TESTING COMMUNICATION PATHS

This invention relates to a method for testing communication paths of an electronic telephone exchange which has a pair of time-sharing communication highways, one for receiving signals and the other for transmitting signals.

The communication paths of an electronic exchange are automatically tested before connecting paths in every time or tested at regular intervals. For example the communication paths of an exchange of time-sharing type are conventionary tested by supplying test signal all the time or at regular intervals in a loop back circuit through the communication highways. Such a use of the loop back circuit renders the exchange even more complicated and even more expensive. Further, these methods are disadvantageous in that they can not test the analog signal processing units of the communication circuit, such as line circuits or trunk circuits.

An object of this invention is to provide a method for testing communication paths of an electronic exchange which has at least a pair of time-sharing communication highways, without using a specially designed hardware.

Another object of this invention is to provide a method for testing the total communication paths of an electronic exchange including both the time-sharing communication highways and line circuits and trunk circuits of the communication paths.

According to this invention there is provided a method for testing communication paths of an electronic exchange which has at least a pair of time-sharing communication highway and a plurality of port circuits which are connected to one another in time-sharing fashion through the first and second communication highways. The inventioned method comprising a first step of detecting at least one of the port circuits which can transfer input signals from the first communication highway to the second communication one; a second step of transferring a test signal to at least one of the port circuits being detected in the first step through the first communication highway, during time slot allotted to the port circuit; a third step of causing said port circuit to deliver the test signal and storing the test signal into memory means through the second communication highway; a fourth step of reading out the test signal from the memory means through the second communication highway to receiving means, during time slot allotted to the receiving means; a fifth step of converting the test signal into a coded signal; and a sixth step of generating a detection signal in the ivent the coded signal is not detected within a predetermined time after the test signal has been transferred in the second step.

This invention can be more fully understood from the following detailed description when taken in conjunction with the accompanying drawings, in which.

Figure 1:
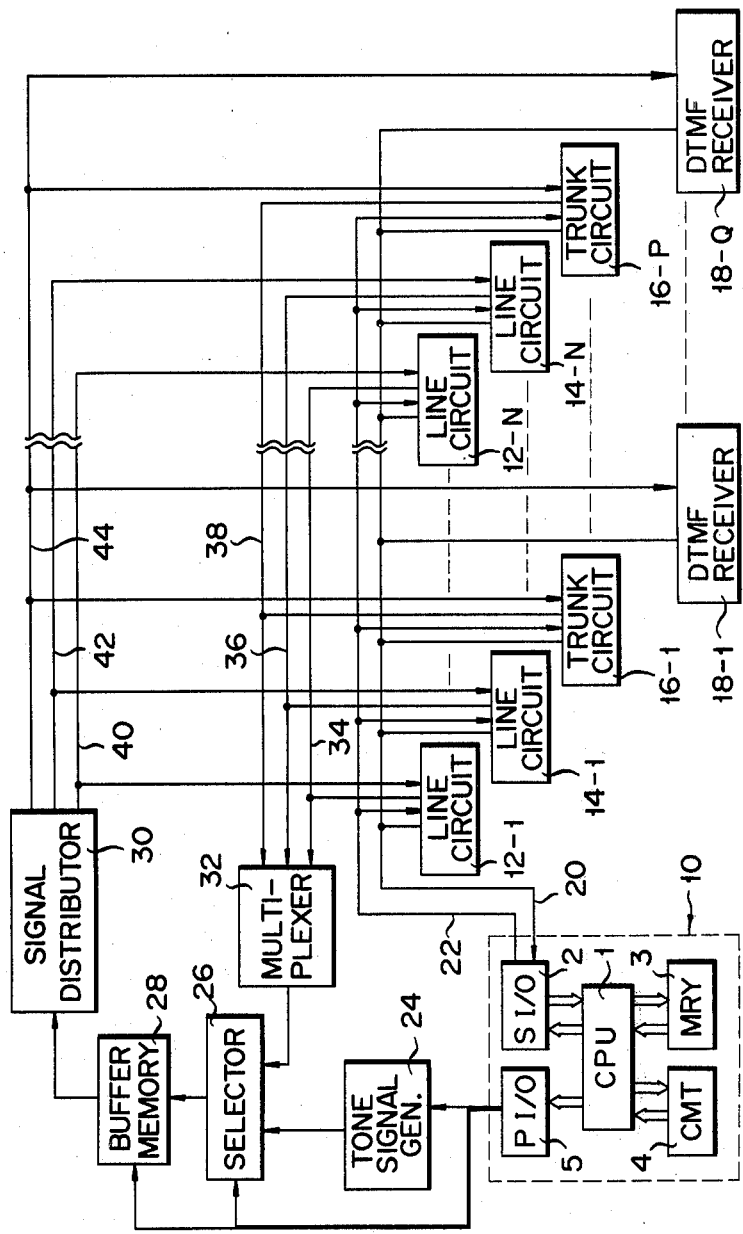
FIG. 1 is a block circuit diagram of the communication paths of an electronic exchange to which a method according to this invention is applied.

FIG. 1 shows the communication paths of a PCM (pulse code modulation) exchange which can connect the touch tone dial telephone to which an embodiment of this invention is applied. The paths are provided with a central control unit 10. The unit 10 comprises a CPU (central processor unit) 1, a serial input/output (S I/O) 2, a memory 3, a magnetic cassette tape 4 and a parallel input/output (P I/O) 5. The memory 3 keeps storing the operation program of the CPU 1 only while it is turned on. Thus, the operation program of the CPU 1 is permanently recorded on the cassette tape 4.

The communication paths are further provided with line circuits 12-1 to 12-N, line circuit 14-1 to 14-N, trunk circuits 16-1 to 16-P and dual tone multi-frequency signal (which is hereinafter referred to as DTMF signal) receivers 18-1 to 18-Q. Various detection signals from these circuits 12, 14, 16 and 18 are supplied to the S I/O 2 through a transmission data highway 20, serially one after another. The S I/O 2 supplies the detection signals to the CPU 1 in parallel fashion, that is, at the same time. On the other hand, control signals from the CPU 1 in parallel fashion are transferred through the S I/O 2 and P I/O 5. The S I/O 2 converts the control signals into series signals, which are supplied via a reception data highway 22 to the line circuits 12-1 to 12-N, line circuits 14-1 to 14-N, trunk circuits 16-1 to 16-P. The P I/O 5 supplies the control signals to a tone signal generator 24, a selector 26 and a buffer memory 28 in parallel fashion.

The tone signal generator 24 stores coded data. These data represent a dial tone signal which is transmitted to a telephone when the receiver thereof is picked up, a DTMF signal which is transmitted via one of the trunk circuits to the central office from a call station when the caller operates a telephone dial, a busy tone signal which is transmitted back to the call station when the called station is busy, and other similar signals. The generator 24 produces these signals according to the control signals from the CPU 1. The output signal of the tone signal generator 24 is supplied to one input terminal of the selector 26.

Voice signals from the line circuits 12-1 to 12-N are supplied via a transmission highway 34 to a first input terminal of a multiplexer 32. Voice signals from the line circuits 14-1 to 14-N are supplied via another transmission highway 36 to a second input terminal of the multiplexer 32. Voice signals from the trunk circuits 16-1 to 16-P are supplied via still another transmission highway 38 to a third input terminal of the multiplexer 32. The multiplexer 32 once latches the three voice signals and then supplies them serially to the other input terminal of the selector 26 at a speed three times higher than the speed at which it received the three voice signals. The selector 26 supplies the output signal of the tone signal generator 24 or the output signal of the multiplexer 32. The output signal of the selector 26 is supplied to the buffer memory 28. In the buffer memory 28 the time slots are replaced with one another, and from the buffer memory 28 the output signal of the selector 26 is read out. The output signal of the memory 28 is supplied to the signal distributor 30. The distributor 30 supplies this signal via a reception highway 40 to the line circuits 12-1 to 12-N, via a reception highway 42 to the line circuits 14-1 to 14-N, and via a reception highway 44 to the trunk circuits 16-1 to 16-P and the DTMF signal receivers 18-1 to 18-Q. P and Q are so selected that the sum of P+Q is equal to N.

In the communication paths of FIG. 1, three pairs of highways are provided, a first pair consisting of the highways 34 and 40, a second pair consisting of the highways 36 and 42 and the third pair consisting of the highways 38 and 40. The line circuits 12-1 to 12-N are connected to the highways 34 and 40, the line circuits 14-1 to 14-N to the highways 36 and 42, and the trunk circuits 16-1 to 16-P and DTMF signal receivers 18-1 to 18-Q to the highways 38 and 44. The circuit arrangement is not limited to this manner. For example, the line circuits 12-1 to 12-N may be connected to the highways 38 and 44, and the trunk circuits 16-1 to 16-P may be connected to the highways 34 and 40. Further, all the circuits 12, all the circuits 14, all the circuits 16 and all the receivers 18 need not be connected to the corresponding pairs of highways. For instance, some of the line circuits 12-1 to 12-N may be connected to the highways 34 and 40. Moreover, less or more than three pairs of highways may be provided. In this case, the signal-reading speed of the multiplexer 33 is varied according to the number of highway pairs provided.

Now referring to FIGS. 2, 3 and 4, the line circuits, trunk circuits and DTMF signal receivers will be described.

Figure 2:
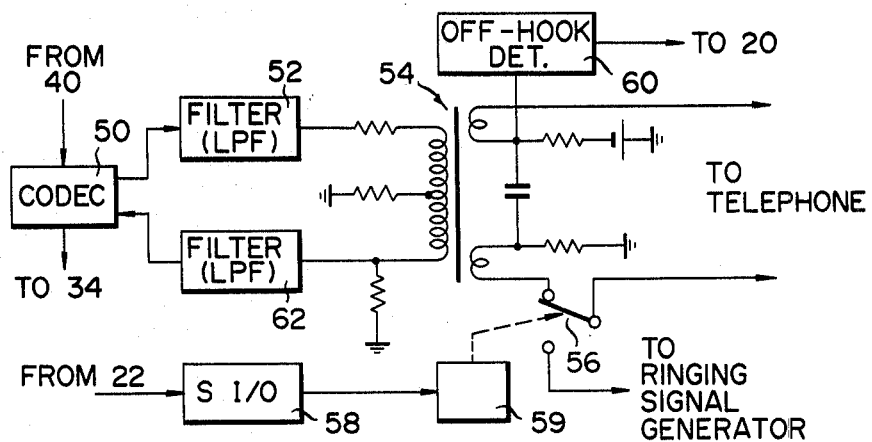
FIG. 2 is a block circuit diagram of a line circuit used in the communication paths of FIG. 1.

FIG. 2 shows the line circuit 12-1, which has the same structure as the other line circuits 12-2 to 12-N. As shown in FIG. 2, the voice signal from the reception highway 40 is supplied to a PCM coder/decoder (hereinafter called "codec") 50 and undergoes digital-to-analog conversion. The analog signal thus obtained is supplied to a lowpass filter 52 and has its waveform rectified. The output of the filter 52 is supplied to one end of one winding of a hybrid transformer 54. Another winding of the transformer 54 is connected via a changeover switch 56 to a touch tone dial or rotary dial telephone (not shown). The movable contact of the switch 56 is connected to the telephone. First and second fixed contacts of the switch 57 are connected to the transformer 54 and a ringing signal generator (not shown), respectively. The changeover switch 56 is controlled by an actuator 59 which is in turn controlled by a control signal supplied from the CPU 1 via the data highway 22 and an S I/O 58. To the winding of the transformer 54, which is disposed on the telephone side, there is connected a off-hook detector 60 the output of which is supplied to the transmission data highway 20. The voice signal from the telephone is supplied to the codec 50 through the hybrid transformer 54 and a lowpass filter 62. The codec 50 converts the voice signal (i.e. analog signal) into a digital signal, which is transmitted through the transmission highway 34. All the line circuits 12-1 to 12-N and 4-1 to 14-N are not connected to telephones, so that more telephones may be connected to the exchange if necessary in the future.

Figure 3:
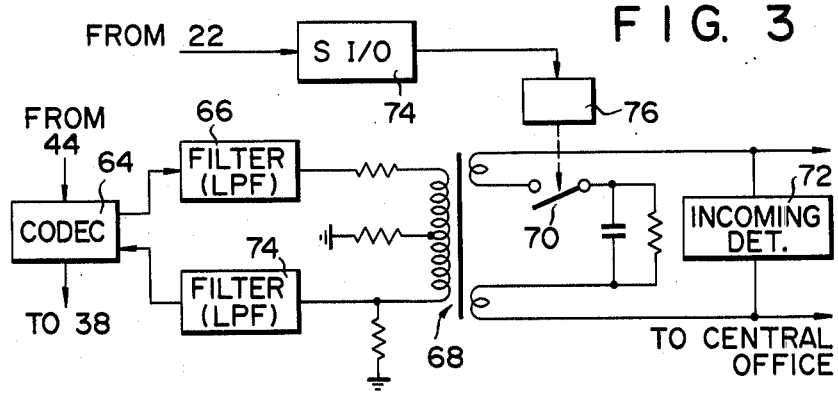
FIG. 3 is a block circuit diagram of a trunk circuit used in the communication paths of FIG. 1.

FIG. 3 shows the trunk circuit 16-1, which has the same structure as the other trunk circuits 16-2 to 16-P. As shown in FIG. 3, the voice signal from the reception highway 44 is supplied to a codec 64 and undergoes digital-to-analog conversion. The analog signal thus produced is supplied to a lowpass filter 66 and has its waveform rectified. The output of the filter 66 is supplied to one end of one winding of a hybrid transformer 68. The other winding of the transformer 68 is connected via a switch 70 to a central office (not shown).

The switch 70 is controlled by an actuator 76 which is in turn controlled by a control signal supplied from the CPU 1 through the data highway 22 and an S I/O 74, thereby to constitute a loop jointly with the central office. To the winding of the hybrid transformer 68, which is provided on the central office side, there is connected an incoming detector 72. The voice signal supplied from the central office is supplied to the codec 64 through the transformer 68 and a lowpass filter 74. The codec 64 converts the voice signal (i.e. analog signal) into a digital signal, which is transmitted through the transmission highway 38. All the trunk circuits 16-1 to 16-P need not be connected to the central office, so that more telephones may be connected to the exchange if necessary in the future.

Figure 4:
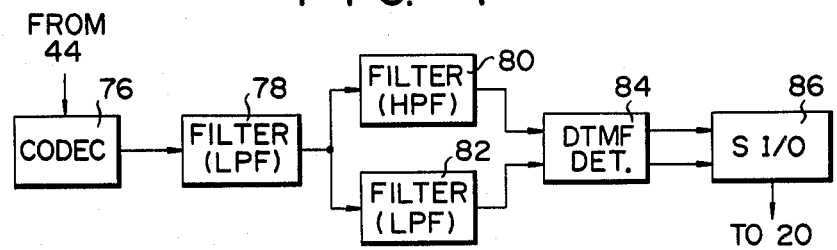
FIG. 4 is a block circuit diagram of a dual tone multi-frequency signal receiving circuit used in the communication paths of FIG. 1.

FIG. 4 shows the DTMF signal receiver 18-1, which receives an address signal from the telephone having a DTMF dial and has the same structure as the other DTMF signal receivers 18-2 to 18-Q. As shown in FIG. 4, a DTMF signal from the reception highway 44 is supplied to a codec 78 and is converted into an analog signal, which is supplied to a highpass filter 80 and a lowpass filter 82. The highpass filter 80 delivers the high frequency component of the DTMF signal, and the lowpass filter 82 the low frequency component thereof. A pair of output signals of the filters 80 and 82 are supplied to a DTMF signal detector 84. The DTMF signal detector 84 detects a DTMF signal which consists of a high frequency component and a low frequency component. It translates the DTMF signal into a dial numerical code. The dial numerical code is supplied to an S I/O 86 and converted into serial signals, which are transmitted to the central control unit 10 through the transmission data highway 20.

Now it will be described how the PCM exchange shown in FIG. 1 operates in case the line circuit 12-1 is connected to the trunk circuit 16-1, the line circuit 14-1 is connected to the line circuit 12-N, the tone signal generator 24 supplies a dial tone signal to the line circuit 14-N, and a DTMF signal is supplied to the DTMF signal receiver 18-Q. In this case, it is necessary to transfer a voice signal between the line circuit 12-1 and the trunk circuit 16-1 and a voice signal between the line circuit 14-1 and the line circuit 12-N. To achieve this, the line circuits 12-1 to 12-N are connected to the highways 34 and 40, and the line circuits 14-1 to 14-N to the highways 36 and 42. The signals from the line circuits 12-1 to 12-N are allotted to 1st to Nth time slots of the highways 34 and 40. Similarly, the signals from the line circuits 14-1 to 14-N are allotted to 1st to Nth time slots of the highways 36 and 42. The trunk circuits 16-1 to 16-P are connected to the transmission highway 38, and the signals from the trunk circuits 16-1 to 16-P are allotted to 1st to Pth time slots of the highway 38. Thus, no signals are allotted to (P+1)th to Nth time slots of the highway 38. The trunk circuits 16-1 to 16-P and the DTMF signal receivers 18-1 to 18-Q are connected to the reception highway 44. Here, P+Q=N. The signals to the circuits 16-1 to 16-P are allotted to 1st to Pth time slots of the highway 44, and the signals to the receivers 18-1 to 18-Q are allotted to (P+1)th to Nth time slots of the highway 44, respectively.

More specifically, the signals at the various parts of the communication paths of FIG. 1 are allotted to time slots of the highways as illustrated in FIGS. 5A to 5K.

Figure 5A:
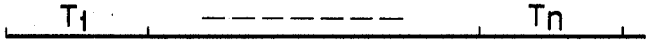
FIGS. 5A to 5K are time charts schematically showing how signals at various parts of the communication paths of FIG. 1 are allotted to time slots.
Figure 5B:
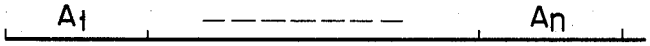
Figure 5C:
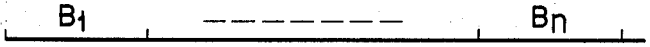
Figure 5D:
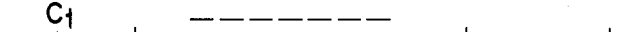

FIG. 5A shows 1st time slot $T_1$ to Nth time slot $T_n$. FIG. 5B shows what signals are allotted to the time slots of the highway 34. FIG. 5C shows what signals are allotted to the time slots of the highway 36. FIG. 5D shows what signals are allotted to the time slots of the highway 38. As FIGS. 5A to 5D indicate, a voice signal $A_1$ from the line circuit 12-1, a voice signal $B_1$ from the line circuit 14-1 and a voice signal $C_1$ from the trunk circuit 16-1 are allotted to the 1st time slots $T_1$ of the highways 34, 36 and 38, respectively. Voice signals $A_n$ and $B_n$ from the line circuits 12-N and 14-N are allotted to the Nth time slots $T_n$ of the highways 34 and 36, respectively. No signal is allotted to the Nth time slot $T_n$ of the highway 38.

The voice signal $A_1$ is a PCM code obtained by removing the high frequency component of a signal from the telephone by means of the lowpass filter 62, by sampling the signal by means of the codec 50 and by converting the signal (i.e. analog signal) into a digital signal. The voice signal $C_1$ is also a PCM code obtained by removing the high frequency component of a signal from the delay line by means of the lowpass filter 74 and by converting the signal (i.e. analog signal) into a digital signal. The voice signal from each of the circuits 12-1 to 12-N, 14-1 to 14-N and 16-1 to 16-P is constituted by 8 bits, which is transmitted through the transmission highways 34, 36 and 38 during a slot time.

Figure 5E:
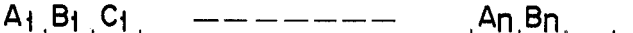
Figure 5F:

The multiplexer 32 receives the signals coming through the transmission highways 34, 36 and 38, latches them for a while and deliver them at a speed three times higher than it received the signals. Thus, as shown in FIG. 5E, a signal supplied through the highway 34 is allotted to the first one-third of each time slot, a signal supplied through the highway 36 to the second one-third of each time slot, and a signal supplied through the highway 38 to the last one-third of each time slot. That is, to the 1st time slot $T_1$ the voice signals $A_1$, $B_1$ and $C_1$ from the circuits 12-1, 14-1 and 16-1 are allotted. In a similar manner, dial tone signals $X_1$ to $X_{n-1}$ and a DTMF signal $XF_n$ are allotted to the time slots $T_1$ to $T_n$, three to each time slot, as illustrated in FIG. 5F.

Figure 5G:
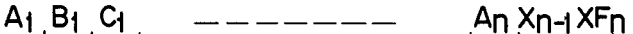

The selector 26 supplies to the buffer memory 28 the output signals (FIG. 5E) of the multiplexer 32 and the tone signal generator 24 selectively so as to deliver signals in such a way as illustrated in FIG. 5G. That is, the selector 26 delivers all the output signals of the multiplexer 32 but the voice signal $B_n$ from the trunk circuit 16-N and then delivers the dial tone signal $X_{n-1}$ and the DTMF signal $XF_n$ from the tone signal generator 24. As a result, the voice signals $A_1$, $B_1$ and $C_1$ are allotted to 1st time slot $T_1$, and the voice signal $A_n$, which is to be exchanged, the dial tone signal $X_{n-1}$ and the DTMF signal $XF_n$ to Nth time slot $T_n$. The output signals of the selector 26 are stored into the buffer memory 28, byte by byte, each byte into the corresponding address.

Figure 5H:

The signals are read out from the buffer memory 28 in such a way as to be transmitted through the reception highway 40, 42 or 44 which is connected to the called station, during the time slot allotted to the called station. More precisely, to connect the line circuit 12-1 to the trunk circuit 16-1, in the 1st time slot $T_1$ the voice signal $A_1$ from the line circuit 12-1 and the voice signal $C_1$ from the trunk circuit 16-1 exchange their positions according to a control signal from the CPU 1 as shown in FIG. 5H. Further, to connect the line circuit 14-1 to the line circuit 12-N, the voice signal $A_n$ from the line circuit 12-N and the voice signal $B_1$ from the line circuit 14-1 exchange their positions as illustrated also in FIG. 5H. Moreover, to supply the dial tone signal $X_{n-1}$ and the DTMF signal $XF_n$ to the line circuit 14-N and the DTMF signal receiver 18-Q, respectively, these signals $X_{n-1}$ and $XF_n$ are allotted again to the second one-third and last one-third of the Nth time slot $T_n$ as shown in FIG. 5H.

Figure 5I:
Figure 5J:
Figure 5K:

The signal distributor 30 distributes the output signals of the buffer memory 28 to time slots of the reception highways 40, 42 and 44 as illustrated in FIGS. 5I, 5J and 5K. That is, the signal allotted to the first one-third of each time slot is transmitted through the highway 40, the signal allotted to the second one-third of each time slot through the highway 42, and the signal allotted to the last one-third of each time slot through the highway 44. Consequently, the line circuit 12-1 and the trunk circuit 16-1 are connected to each other, the line circuit 14-1 and the line circuit 12-N are connected to each other, and the dial tone signal $X_{n-1}$ and the DTMF signal $XF_n$ both from the tone signal generator 24 are supplied to the line circuit 14-N and the DTMF signal receiver 18-Q, respectively.

Now it will be described how to test the communication paths of the PCM exchange shown in FIG. 1 to FIG. 4.

First, a DTMF signal is supplied to the DTMF signal receiver 18-Q in the above-described manner. The receiver 18-Q converts the DTMF signal into a dial code signal. The dial code signal is supplied to the S I/O 86 and converted into parallel signals, which are transferred to the CPU 1 via the transmission data highway 20. If both the reception highway 44 and the transmission data highway 20 work normally, the CPU 1 receives a dial code signal a predetermined time after it has supplied a control signal to the tone signal generator 24 to make the same to produce a DTMF signal corresponding to the dial code signal. If the highway 44 or the highway 20 fails to work normally, the CPU 1 cannot receive a dial code signal even after the predetermined time has lapsed. In this way, the highways to which the DTMF signal receiver 18-Q are tested, and it is found whether or not they work normally.

If both highways to which the DTMF signal receiver 18-Q is connected are found to work, then some or all of the other highways are tested. For example, the CPU 1 detects those of the line circuits 12-1 to 12-N, 14-1 to 14-N, trunk circuits 16-1 to 16-P which are idle. The CPU 1 detects the line circuits which are idle, according to the detection signals from the off-hook detectors 60. It detects the trunk circuits which are idle, according to the detection signals from the received signal detectors 72. Each highway can be tested only if at least one of the circuits connected to it is idle. If all the circuits connected to each highway are used, it would not matter. One circuit or two become idle a few seconds later, and the highway can then be tested because the test according to this invention can be carried out at any time as long as at least one of the circuits connected to the highway is idle. To supply a DTMF signal from the generator 24 to the circuit which is idle, the CPU 1 supplies a control signal to the tone signal generator 24, the selector 26 and the buffer memory 28. The control signal causes the generator 24, the selector 26 and the memory 28 to form a circuit for supplying the DTMF signal to the idle circuit, a circuit for connecting the idle circuit to the other idle circuits and a circuit for connecting one of the idle circuits to the DTMF signal receiver 18-Q.

The auxiliary line circuits and the trunk circuits are always idle. The other general line circuits and trunk circuit are idle only when the telephones are on-hook or when the switches 70 are not closed. The hybrid transformers 54 of the line circuits are in matching state when the telephones 56 are off-hook. The hybrid transformers 68 of the trunk circuits are in matching state when the switches 70 are closed. The transformers 54 and 68 have the maximum return loss of about 20-30 dB when they are in matching state. When they come out of matching state, the hybrid transformers 54 and 68 have a smaller return loss. Thus, a DTMF signal from the tone signal generator 24 is not recieved by the telephones of the idle line circuits or by the central office connected to the idle trunk circuits. It is therefore supplied from the idle line circuits or the idle trunk circuits to the DTMF signal receiver 18-Q through all or some of the transmission highways and the reception highway 44.

If the line circuit 12-1, the line circuit 14-1 and the trunk circuit 16-1, for example, are idle, the DTMF signal is transferred to the DTMF signal receiver 18-Q through the highway 40, the line circuit 12-1, the highway 34, the multiplexer 32, the signal distributor 30, the highway 42, the line circuit 14-1, the highway 36, the multiplexer 32, the signal distributor 30, the highway 44, the trunk circuit 16-1, the highway 38, the multiplexer 32, the signal distributor 30 and the highway 44. When the CPU 1 receives the dial signal, it is ascertained that the highways work in a desired manner. If it does not receive the dial signal, the highways are considered not to work in a desired manner.

In case the highways are found not to work in a desired manner, each pair of highways is then tested. That is, the highways 34 and 40, the highways 36 and 42 and the highways 38 and 44 will be tested. To test each pair of highways, the CPU 1 forms a communication path consisting of, for example, the highway 40, the line circuit 12-1, the highway 34, the multiplexer 32, the signal distributor 30, the highway 44, and the DTMF signal receiver 18-Q. If any one of the highway pairs is found not to function in a desired manner, a DTMF signal is transferred through said communication path, allotted to a different time slot. The DTMF signal is allotted to a different time slot in order to ascertain which part has failed to pass the previously applied signal, the analog signal processing units of the line circuits or the trunk circuits, the DTMF signal receivers, the pair of highways themselves, or the buffer memory 28. If this test, wherein the DTMF signal is allotted to a different time slot, shows that the pair of highways function in a desired manner, then the highways are found to be functioning correctly, while the analog signal processing units and/or the buffer memory 28 is found to be functioning erroneously.

As mentioned above, the method according to invention tests the communication paths of a PCM exchange in, so to speak, two steps. First, it tests the communication paths. Second, even if the communication paths are found to work, each of the highway pairs is tested, using a DTMF signal allotted to a different time slot. This two-step serves to achieve a test of the communication paths including the analog signal processing units and the buffer memory of the PCM exchange. The results of the test may be display by, for example, an alarm lamp. Since it utilizes a few of the circuits which are idle, the test can be conducted almost whenever desired, without using a specially designed hardware.

If the telephone of, for example, the line circuit 12-1 which is idle and to which a DTMF signal is supplied from the tone signal generator 24 happens to come into off-hook state during the test, the off-hook detector 60 of the circuit 12-1 supplies a detection signal to the CPU 1 via the transmission data highway. Upon receipt of the detection signal, the CPU 1 cuts the circuit loop for conducting the test, thus stopping the test so that the telephone can be used.

To test the data highways 20 and 22, the CPU 1 supplies interrogation signals to the line circuits, the trunk circuits and the DTMF signal receivers.

Figure 6:
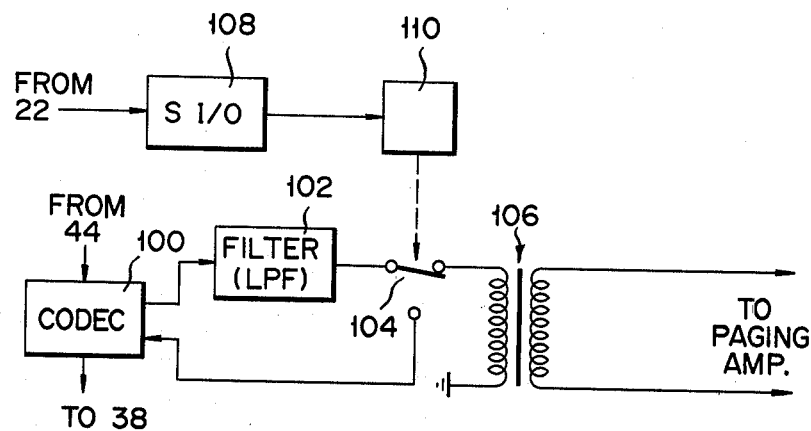
FIG. 6 is a block circuit diagram of a paging trunk circuit used in the communication paths of FIG. 1.

Further, at least one of the trunk circuits 16-1 to 16-P may be replaced by such a paging trunk circuits as shown in FIG. 6. The paging trunk circuit only receives voice signals. In the paging trunk circuit, a codec 100 converts a voice signal from the reception highway 44 into an analog signal, which is supplied via a lowpass filter 102 to the fixed contact of a changeover switch 104. The first movable contact of the switch 104 is connected to one winding of a transformer 106. The second movable contact of the switch 104 is connected to the transmission highway 38 through the codec 100. The winding of the transformer 106 is connected to a paging amplifier (not shown). The switch 104 is controlled by an actuator 110 which is in turn controlled by a control signal supplied from the CPU 1 through the reception data highway 22 and an S I/O 108. Usually the switch 104 is switched to the first movable contact and is thus connected to the transformer 106. It is switched to the second movable contact only when the test is to be conducted. As long as the switch 104 is switched to the second movable contact, the paging trunk circuit delivers a DTMF signal from the tone signal generator 24 through the transmission highway 38. Thus, the communication paths can be tested by using the paging trunk circuits as idle circuits, only if the communication paths are so designed as to transfer the dial signal from the paging trunk circuits to the DTMF signal receiver 18-Q.

What we claim is:

1. A method for testing communication paths of an electronic exchange which has at least a pair of time-sharing communicating highways and a plurality of port circuits which are connected to one another in time-sharing fashion through the first and second communication highways, said method comprising:

a first step of detecting at least one of said port circuits which can transfer input signals from the first communication highway to the second communication highway;

a second step of transferring a test signal to said port circuits being detected in the first step through the first communication highway;

a third step of causing one of said plurality of port circuits to deliver the test signal and storing the test signal into memory means through the second communication highway;

a fourth step of reading out the test signal from the memory means through the second communication highway to receiving means, during time slot allotted to the receiving means;

a fifth step of converting the test signal into a coded signal; and a sixth step of generating a detection signal when the coded signal is not detected within a predetermined time after the test signal has been transferred in the second step.

2. The method according to claim 1, wherein said first step is to detect at least one of line circuits connected to said first communication highway, which is connected to a telephone in on-hook state.

3. The method according to claim 1, wherein said first step is to detect at least one of trunk circuits connected to said first communication highway, which is not connected to a central office.

4. The method according to claim 1, wherein said first step is to detect at least one of line circuits connected to said first communication highway, which is connected to no telephone.

5. The method according to claim 1, wherein said first step is to detect at least one of paging trunk circuits connected to said first communication highway and to disconnect a changeover switch of the paging trunk circuit from a transformer thereof and connect the same to a codec thereof.

6. The method according to claim 1, wherein said second step is to transfer a dual tone multi-frequency signal generated from this exchange to said port circuit as the test signal and said fourth step is to supply the test signal stored in the memory means to a dual tone multi-frequency signal receiver.

* * * * *